Patented Sept. 25, 1951

2,569,217

UNITED STATES PATENT OFFICE 2,569,217

METHOD AND PACKAGE FOR PRESERVING FOOD

Nishan S. Bagdigian, Charlestown, Mass., assignor of one-half to Aram A. Arabian, Providence, R. I.

No Drawing. Application May 2, 1949,
Serial No. 91,011

1 Claim. (Cl. 99—68)

My present invention relates to food packaging, and more particularly to a novel food package and method of packaging.

The principal object of the present invention is to provide a novel package and novel method of packaging which will preserve the quality, and flavor of foods and prevent deterioration.

Another object of the present invention is to provide a method of packaging and a novel package which will keep the food out of contact with the air.

A further object of the present invention is to provide a means and method of packaging food that can readily be applied to different types of foods and packages.

With the above and other objects and advantageous features in view, my invention consists of a novel food package and novel method of packaging, more fully disclosed in the detailed description following, and more particularly defined in the appended claim.

It has been found that certain types of foods such as coffee, potato chips, peanut butter, roasted nuts, etc., deteriorate rapidly when exposed to the oxygen in the atmosphere. The food packaging industry has gone to a great deal of trouble to prevent this. Sealed containers, vacuum packing, and other methods are used. However, these methods are only partially successful and the deterioration is merely retarded. Of course, after the package is opened, even the partial protection is lost.

The present invention is designed to overcome these difficulties and to provide complete protection for the food. This is accomplished by surrounding the food with a protective inert gas such as nitrogen, carbon dioxide, argon, neon, etc. This is accomplished by processing and packaging, where feasible, or at least packaging the food in a chamber saturated with the desired gas. The sealed package will then contain the protective gas instead of air and the food will not deteriorate. In the case of vacuum packing, it is known that such vacuums are not 100% efficient. Gas at atmospheric pressure is much more effective.

While any of the inert gases may be used, carbon dioxide is preferable because it is heavier than air and cheap to produce. Because it is heavier than air, it will remain in an opened package and continue to protect the food. No pressure is required to retain it in the packages.

As an example, assume that it is desired to manufacture coffee in individual coffee bags. The bags and the ultimate container must be kept absolutely free from atmospheric gases, mainly oxygen. After roasting, the coffee is cooled and ground in a chamber full of carbon dioxide. It is then bagged in the presence of carbon dioxide, and packed and sealed in containers charged at atmospheric pressure with carbon dioxide. The coffee is thus preserved roaster fresh and will keep indefinitely. Even when the container is opened to remove a bag, the heavy carbon dioxide will remain to protect the remaining bags.

The above process can be similarly applied to packaged potato chips, roasted nuts, popcorn, peanut butter, and many other foods that have a tendency to deteriorate in the packages. The process is simple to carry out and economical in operation. Other advantages will be readily apparent to a person skilled in the art.

I claim:

A method of packaging coffee comprising roasting, cooling, drying and grinding the coffee in a chamber full of carbon dioxide, and packaging and sealing the coffee in a chamber full of carbon dioxide.

NISHAN S. BAGDIGIAN.

REFERENCES CITED

The following references are of record in the file of this patent:

UNITED STATES PATENTS

| Number | Name | Date |
|---|---|---|
| 1,924,059 | Hoskins | Aug. 22, 1933 |
| 2,009,321 | McKinnis | July 23, 1935 |
| 2,037,037 | Moore | Apr. 14, 1936 |
| 2,335,192 | Moore | July 26, 1940 |
| 2,353,029 | Graham, Jr. | July 4, 1944 |
| 2,380,339 | Siedentopf | July 10, 1945 |